J. H. SHIELS & G. J. BAMPTON.
MACHINE FOR ASSEMBLING HOLLOW HANDLED CUTLERY.
APPLICATION FILED NOV. 24, 1913.
1,098,848.
Patented June 2, 1914.
3 SHEETS—SHEET 1.
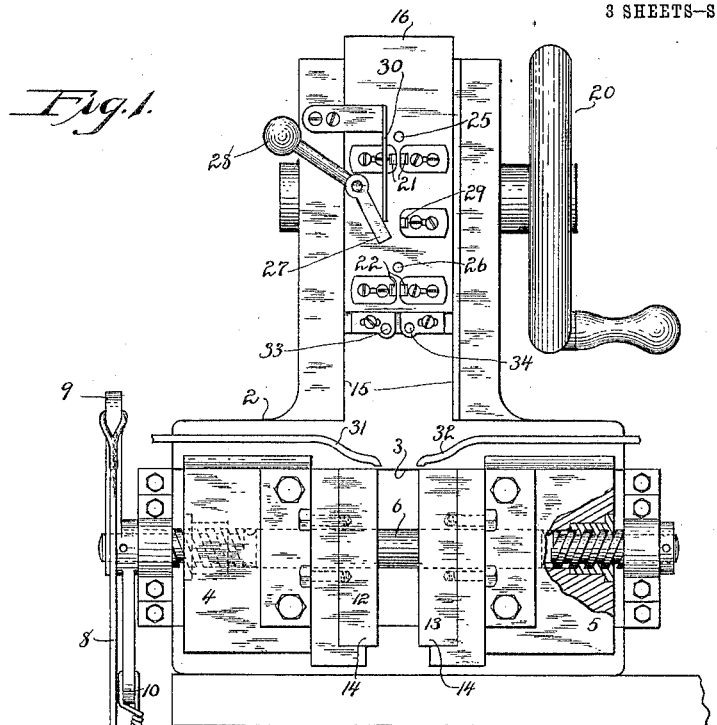
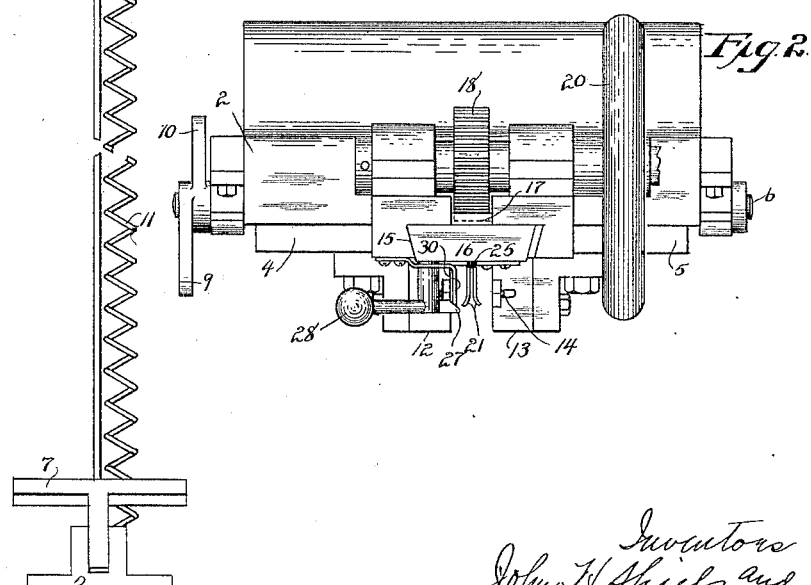

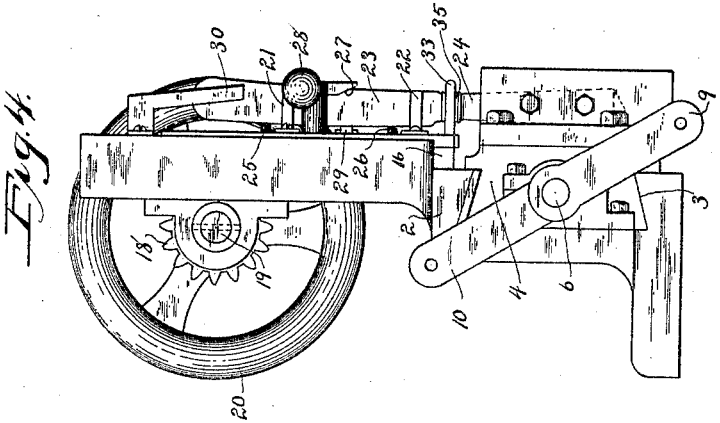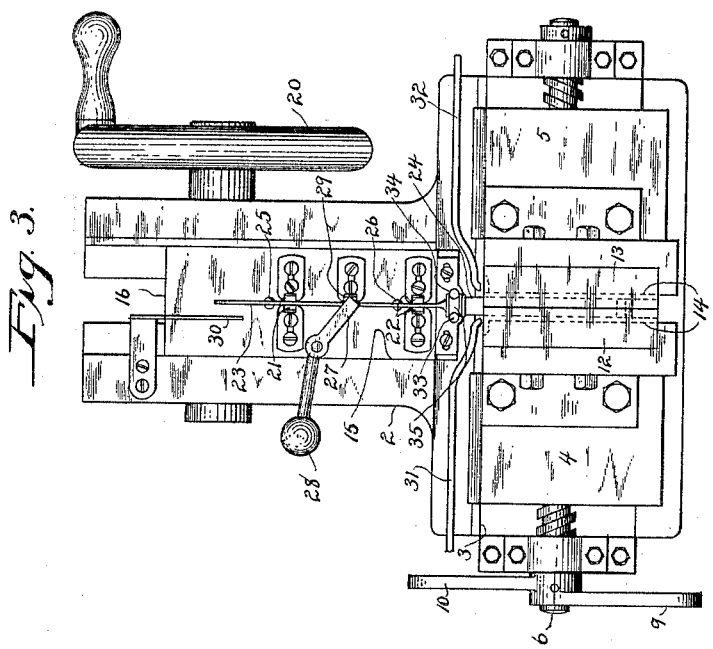

J. H. SHIELS & G. J. BAMPTON.
MACHINE FOR ASSEMBLING HOLLOW HANDLED CUTLERY.
APPLICATION FILED NOV. 24, 1913.
1,098,848.
Patented June 2, 1914.
3 SHEETS—SHEET 3.
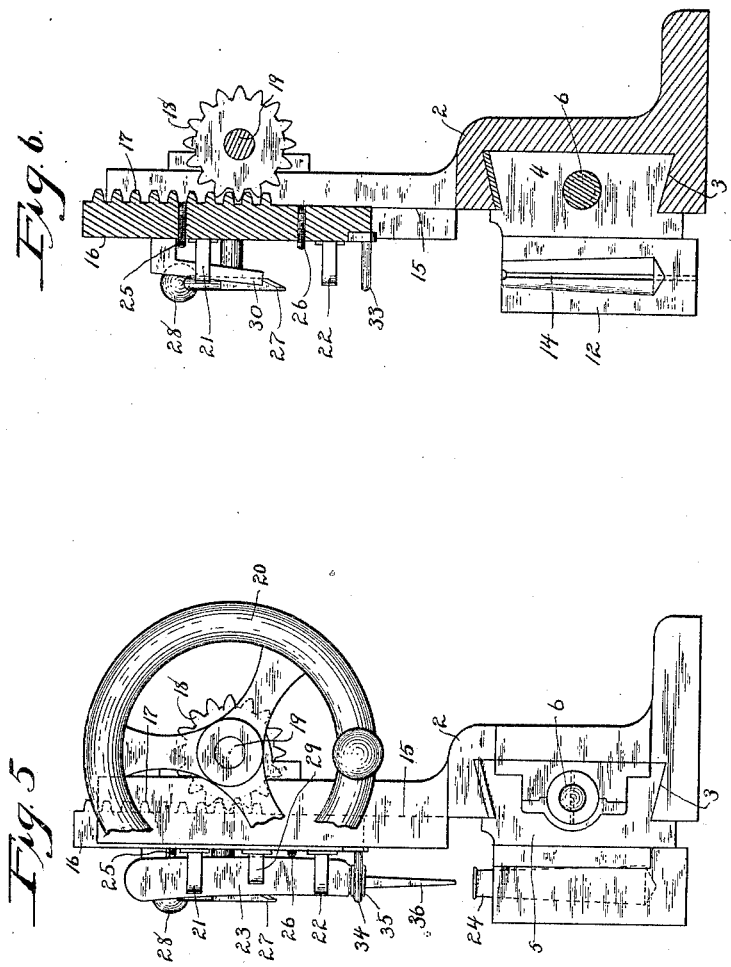

UNITED STATES PATENT OFFICE.

JOHN H. SHIELS AND GEORGE J. BAMPTON, OF WALLINGFORD, CONNECTICUT, ASSIGNORS TO INTERNATIONAL SILVER CO., OF MERIDEN, CONNECTICUT, A CORPORATION OF NEW JERSEY.

MACHINE FOR ASSEMBLING HOLLOW-HANDLED CUTLERY.

1,098,848.      Specification of Letters Patent.      Patented June 2, 1914.

Application filed November 24, 1913. Serial No. 802,661.

*To all whom it may concern:*

Be it known that we, JOHN H. SHIELS and GEORGE J. BAMPTON, citizens of the United States, residing at Wallingford, in the county of New Haven and State of Connecticut, have invented a new and useful Improvement in Machines for Assembling Hollow-Handled Cutlery; and we do hereby declare the following, when taken in connection with the accompanying drawings and the characters of reference marked thereon, to be a full, clear, and exact description of the same, and which said drawings constitute part of this application, and represent, in—

Figure 1 a front view, partially in section, of a machine for assembling hollow handled table cutlery shown in the open position. Fig. 2 a top or plan view of the same, with the treadle and spring omitted, as they are in the remaining figures. Fig. 3 a front view, in the closed position, showing the knife blade united with its handle. Fig. 4 a right hand side view of the same. Fig. 5 a left hand side view in the open position, with a portion of the hand wheel broken away. Fig. 6 a vertical sectional view in the same position with the knife blade and handle removed.

This invention relates to an improvement in machines for assembling hollow handled table cutlery. In the usual manner of connecting the blades and handles, the handles, whether drawn from a single piece of metal or formed from two shells united, are filled with resin or other suitable material in a plastic state, and the shanks of the blades or fork tines are inserted into the handle and held there until the plastic material sets or hardens sufficiently to connect the shanks with the handles, and great care must be exercised to be sure that the blades or tines are in alinement with the handle. This requires care and skill and is a slow operation.

The object of this invention is to produce a machine in which blades or tines may be connected with their handles and so that alinement is assured; and the invention consists in the construction hereinafter described and particularly recited in the claims.

In carrying out our invention, we employ a vertically arranged frame or block 2 having a transverse guideway 3 in which are mounted chuck blocks 4, 5, upon a right and left hand threaded screw 6 by which the blocks are moved toward and away from each other. This screw may be turned by a treadle 7 connected by a link 8 with an arm 9 attached to the screw 6, and if a treadle is used, a second arm 10 will be connected with the screw 6 and connected by a strong spring 11 with the floor or other point so as to reverse the movement of the screw from that imparted to it by the treadle. These blocks 4 and 5 are adapted to receive jaws 12 and 13 the adjacent faces of which conform to the design of the handles to be held, and preferably these jaws will be provided with vertically arranged grooves 14 furnishing passages for water as will be hereinafter described. At right angles to the guide-way 3 is a vertically arranged guide-way 15 in which is mounted a vertically movable slide 16 formed at its rear with a rack 17 meshing with a pinion 18 on a horizontal shaft 19 which is provided with a hand wheel 20. On the face of the slide are spring clips 21 and 22 between which a knife blade 23 may be inserted, the spring fingers being so arranged as to hold the blade against lateral movement and in line with the handle 24 held by the jaws 12 and 13. In the center of the slide are stop set screws 25, and 26, against which the edge of the blade will be crowded by a cam 27 pivoted to the slide and provided at its outer end with a weight 28 the tendency of which is to lift the cam and crowd it against the back of the knife so as to crowd the cutting edge of the blade inward against the set screws carried by the slide. In line with this cam is a spring-finger 29 which will arrest any straining movement which the cam may impart to the blade. Secured to the frame and extending downward into the path of the cam is a tripping finger 30 which, as the slide rises, will swing the cam away from the blade. Extending over the handle-holding jaws are water pipes 31, 32, which discharge water onto the handle-gripping jaws in line with the grooves 14.

In assembling table cutlery, a previously formed hollow handle 24 is inserted between the jaws 12 and 13, and the treadle 7 depressed so as to crowd the jaws together and firmly hold the handle. A blade is then inserted in a vertical position between the spring-fingers 21 and 22, and is held in proper position vertically by means of bolster pins 33 and 34 between which the bolster 35 will stand, thus fixing the vertical position of the blade with relation to the slide and holding the shank 36 in proper relation to enter the handle 24. The handle is then filled with resin or other suitable adhesive material in a heated state, and the hand-wheel 20 turned so as to force the slide downward and crowd the shank 36 into the handle 24. As the slide descends the cam 27 under the pressure of its weight 28, crowds against the back of the knife blade as clearly shown in Fig. 4, so that the blade is held in proper alinement for the shank to enter the handle and the bolster stand true with the upper end of the handle. When properly inserted, water is admitted through the pipes 31 and 32, which passing down on opposite sides of the handle, cools the adhesive substance within the handle so as to harden or set it, during which operation the handle and blade are firmly held in proper alinement. As soon as the plastic material in the handle has sufficiently set, the treadle is released, allowing the spring 11 to turn the screw 6 so as to open the jaws 12 and 13 to release the handle. The hand wheel 20 is then turned to lift the slide, and with it the completed knife as the handle will rise with the blade. As the slide rises the cam 27 is retired by the finger 30 and the completed knife freely removed from between the spring fingers 21 and 22, and the knife removed ready for final finishing.

While we have shown and described a machine for assembling knife blades with their handles, it is apparent without further illustration or description, that forks may be assembled in the same way, the spring fingers 21 and 22 being adjusted to receive a fork instead of the blade.

We claim:—

1. A machine for assembling hollow handled cutlery, comprising a frame, a pair of sliding jaws mounted therein and between which a handle may be gripped means for holding said jaws, a slide operating at right angles to the movement of the jaws and in line with them and adapted to support an article of cutlery with the shank in line with the handle, and means for depressing the slide whereby the shank is forced into the handle held between the jaws.

2. A machine for assembling hollow handled cutlery, comprising a frame two horizontally movable slides mounted therein, handle-gripping jaws carried by said slides, means for moving the slides toward and away from each other, a vertical slide arranged above the horizontal slides and in line with them, holders on said vertical slide and adapted to support a blade or tine-piece, and means for moving the vertical slide whereby the blade or tine-piece is inserted into the handle.

3. A machine for assembling hollow handled cutlery, comprising a pair of slides, handle-gripping jaws carried by said slides, a right and left hand screw on which the slides are mounted, means for turning said screw, a vertically movable slide above and in line with said jaws, means for moving said slide, spring-fingers secured to the face of the slide, and a weight-actuated locking cam pivoted to the face of said vertical slide.

4. A machine for assembling hollow handled cutlery, comprising horizontally movable slides, handle-jaws carried by said slides, means for moving the slide toward and from each other, a vertically movable slide above and in line with said jaws, and means for moving the same, spring fingers secured to the face of said vertical slide, and bolster pins projecting outward from the outer face of the lower end of the vertical slide.

5. A machine for assembling hollow handled cutlery, comprising horizontally movable slides, handle-jaws carried by said slides, means for moving the slides toward and from each other, a vertically movable slide, and means for moving the same above and in line with said jaws, centrally arranged plate gripping spring fingers secured to the face of said slide, bolster pins projecting outward from the lower end of the vertical slide, and set screws carried by the slide in rear of said spring fingers.

6. A machine for assembling hollow handled cutlery, comprising two transversely movable slides, handle-holding jaws formed with grooves and carried by said slides, means for moving said slides, a vertically movable slide above and in line with said jaws, and means for moving the same, and water pipes discharging in line with the grooves in the handle-holding jaws.

In testimony whereof, we have signed this specification in the presence of two subscribing witnesses.

JOHN H. SHIELS.
G. J. BAMPTON.

Witnesses:
W. H. BROWNING,
S. W. HUBBARD.

Copies of this patent may be obtained for five cents each, by addressing the "Commissioner of Patents, Washington, D. C."